United States Patent [19]

Kobashi et al.

[11] Patent Number: 4,873,352

[45] Date of Patent: Oct. 10, 1989

[54] TRANSPARENT AQUEOUS TIN COMPOUND SOLUTION

[75] Inventors: Toshiyuki Kobashi; Hideo Naka, both of Okayama, Japan

[73] Assignee: Japan Exlan Company Limited, Osaka, Japan

[21] Appl. No.: 11,863

[22] Filed: Feb. 4, 1987

[30] Foreign Application Priority Data

Feb. 8, 1986 [JP] Japan .................................. 61-26239
Feb. 8, 1986 [JP] Japan .................................. 61-26240
Feb. 8, 1986 [JP] Japan .................................. 61-26241

[51] Int. Cl.⁴ .............................................. C07F 7/22
[52] U.S. Cl. ...................................... 556/105; 423/89; 427/376.2
[58] Field of Search ........................................ 556/105

[56] References Cited

FOREIGN PATENT DOCUMENTS 541849 1/1977 U.S.S.R. .

OTHER PUBLICATIONS

Fuji, Chem Abst., 96:43845d, (1982).
Kawamoto, Chem. Abst., 105:63179x, (1986).

Primary Examiner—Michael L. Shippen
Attorney, Agent, or Firm—Wenderoth, Lind & Ponack

[57] ABSTRACT

By reacting a tin carboxylate with hydrogen peroxide at a particular ratio in an aqueous medium, this invention provides a transparent aqueous tin compound solution which can finally form, in an industrially advantageous manner, tin oxide having excellent transparency, uniformity, compactness, conductivity, etc.

4 Claims, No Drawings

TRANSPARENT AQUEOUS TIN COMPOUND SOLUTION

BACKGROUND OF THE INVENTION (a) Field of the Invention

This invention relates to a transparent aqueous tin compound solution suitable for forming transparent conductive tin oxide and to a method of producing transparent conductive tin oxide using said aqueous solution.

(b) Description of the Prior Art

In recent years, accompanied with the remarkable development in the field of electro-optical elements, attention is paid to transparent conductive membranes of the type of $SnO_2$ or $In_2O_3$. They are actively developed, for example, as transparent electrodes of various optical devices such as those of electro-luminescence, liquid crystals, image accumulation devices, etc.; as heating elements or resistors utilizing their heat resistance and anti-abrasion properties; as solar cells uitizing their high conductivity; or as selective permeable membranes for use in solar heat electricity generation utilizing their high reflexibility in infrared.

Among the methods of forming these transparent conductive membranes are known:

(1) chemical vapor deposition methods,
(2) vacuum evaporation method,
(3) sputtering method,
(4) coating method.

All of the above-mentioned methods (1)–(3) use complicated apparatus and are inferior in operability. In addition, they usually necessitate an etching step after membrane formation, to form a pattern.

In the method (4) also, when using an inorganic salt such as $SnCl_4$ for example, since hydrogen chloride or other chloride gases are generated upon heat decomposion, severe corrosion of the apparatus takes place. Also, the chlorine remaining in the membrane may become a cause of impairing the conductivity. There are also methods of using organic acid salts such as octyl acid tin salt or an organic complex. But in these methods, there are problems such that the uniformity of the membrane is impaired upon heat decomposition or gelation of the coating liquid takes place. Moreover, they have defects such that the formed membrane is uneven, cloudy and is liable to get hurt.

We, the inventors, taking the above-mentioned problems of the prior art into account, carried on further studies, and as a result, we attained this invention.

The object of this invention is to provide a transparent aqueous tin compound solution which has no restriction or problem on the apparatus, has high applicability, and can finally form tin oxide having excellent transparency, uniformity, compactness and conductivity, in an industrially advantageous manner, and to provide a method of producing transparent conductive tin oxide by using said aqueous solution.

SUMMARY OF THE INVENTION

The above-mentioned object of this invention is attained by a transparent aqueous tin compound solution formed by reacting a tin carboxylate with hydrogen peroxide in molar ratio of 1:1.5 or above, in an aqueous medium, and by calcinating said aqueous solution at a temperature above 400° C.

DETAILED DESCRIPTION OF THE INVENTION

As the tin carboxylates used in this invention may be mentioned for example, stannous formate, stannous acetate, stannous oxalate, stannous tartrate, etc. However, for the attainment of this invention, stannous oxalate is preferable.

The quantity of hydrogen peroxide should be 1.5 mol or more, preferably within the range of from 1.6 to 2.2 mol for one mol of the tin salt. When the quantity goes beyond the lower limit of the range, the compactness and conductivity of the finally obtained tin oxide will be lowered, and also no improvement in performance will be observed even if it is used in a quantity more than the actual necessity.

As the aqueous medium, water is usually used, but an amount of a water-miscible organic solvent may be used together in a range in which a viscosity rise or gelation of the reaction-produced solution will not occur.

The method of producing the aqueous solution of the object is to add a tin carboxylate to an aqueous medium under stirring and then add a prescribed quantity of hydrogen peroxide.

Even if the reaction is initiated at room temperature, there are cases where boiling may take place by the reaction heat. Therefore, when the reaction is conducted at a temperature below the boiling point, it is desirable that the concentration of the tin carboxylate should be determined generally below 20 weight %, preferably below 18 weight %. p In order to provide a transparent aqueous solution in which a dopant is uniformly contained and which can finally form tin oxide having excellent transparency, uniformity, compactness, conductivity, etc., it is desirable to make a dopant coexist in the reaction system. Among such dopants may be mentioned compounds containing elements of IB Group such as Cu, Ag, Au; metals of the lanthanide series such as Ce, Eu; those of 5B Group such as V, Nb, Ta; those of 5A Group such as As, Sb, Bi; those of 6B Group such as Cr, Mo, W; those of 7B Group such as Re; those of 8B Group such as Ru, Rh, Pd, Os, Ir, Pt; and fluorine. Among others, compounds containing elements selected from IB, 5B, 5A, 6B, 8B Groups and fluorine are preferable. Especially, coexistence of antimony oxides such as $Sb_2O_3$, $Sb_2O_4$, $Sb_6O_{13}$, etc. in the reaction system makes it possible to form a uniform, reaction-produced transparent aqueous solution, and finally makes it possible to provide tin oxide having very good conductivity. Therefore, such coexistence is desirable.

Desirably, the quantity of such a dopant to be used should be determined to be in the range of from 0.01 to 0.35 mol, preferably from 0.03 to 0.25 mol, for one mol of tin carboxylate.

In this way, a transparent aqueous solution of the tin compound showing a pH below 1.5 can be obtained in a reaction time usually from 5 to 50 minutes. The aqueous solution without any treatment, or after suitable concentration or addition of a dopant, can be subjected to shaping, such as formation of a membrane on a substrate such as a glass plate, or after being made into powder by a suitable operation such as spray drying, it can be calcinated to produce conductive tin oxide.

The calcination conditions employed are generally temperatures from 400° C. to 1000° C., preferably from 500° to 800° C., for 0.5 to 5 hours, preferably for 1 to 3 hours.

As mentioned above, from the transparent aqueous tin compound solution of this invention, it is possible to form tin oxide of excellent transparency, uniformity, compactness, conductivity, etc. in any form such as powder, membrane, etc., without using any complicated apparatus or without any problem of inferior operability. These are the characteristic advantages of this invention.

Thus, the transparent aqueous tin compound solution and the tin oxide produced from said aqueous solution are used in the use fields of fillers, paints, membranes, etc. for which conductivity is especially required, or in various use fields such as transparent heating elements, gas sensors, infrared reflexing membranes, lithium ion selective adsorption agents, catalysts, flame-retardants, etc.

EXAMPLES

This invention will be explained in detail by way of Examples in the following. In the Examples. the conductivity was obtained as follows:

The reaction-produced liquid is spray-dried and pulverized by means of a ball mill into particles having an average particle diameter of about $5\mu$. The particles are calcinated at 500° C. for 3 hours to produce a sample. One gram of the sample is packed into an electrode for solid matter use (SE-70 type), produced by Ando Denki Co. Then the electrode spring is set, and by means of a LCR-meter (AX-221 type) produced by ADEX Co. Ltd., the electric resistance ($\Omega$) is obtained.

The bulk density (g/ml) was obtained as follows:

A sample of 10 g is packed into a cell (inner diameter: 20.5 mm; length: 50 mm). The compressed heights (h mm) are obtained under various loads of the electrode piston (inner diameter: 20 mm, length: 60 mm).

The resistivity ($\Omega\cdot$cm) was obtained by measuring the electric resistance R ($\Omega$) using a four probe ohm meter (3224 type) produced by Hioki Denki Co. Ltd.

EXAMPLE 1

Stannous oxalate ($SnC_2O_4$) was added to water of room temperature and the mixture was stirred to form a slurry. An aqueous 35 weight % hydrogen peroxide solution was added to the slurry in the ratios shown in Table 1 below for one mol of $SnC_2O_4$ to react for 30 minutes, producing 5 kinds of transparent aqueous solutions (A–E). The concentration of $SnC_2O_4$ in each raction system was determined at 15 weight %.

The pH value of each reaction-produced liquid as well as the bulk density and conductivity of the calcinated samples were measured. The results are shown together in Table 1.

TABLE 1

| Sample | $H_2O_2$ (mol) | pH of the reaction-produced liquid | Calcinated sample Bulk density (g/ml)* | Conductivity (k$\Omega$) |
|---|---|---|---|---|
| A | 1.0 | 1.7 | 2.4 | 1,600 |
| B | 1.3 | 1.7 | 2.4 | 1,400 |
| C | 1.6 | 0.8 | 3.2 | 160 |
| D | 2.0 | 0.6 | 3.4 | 150 |
| E | 2.2 | 0.6 | 3.3 | 150 |

*Values under the load of 1 t/cm²

From the above Table, it is clearly understood that by following this invention, it is possible to provide a transparent aqueous tin compound solution which can form tin oxide having high compactness and exhibiting excellent conductivity.

On the other hand, to a 15 weight % aqueous solution of stannic chloride, an aqueous ammonium solution was added so that the pH of the solution became 8, thereby to produce colloidal stannic hydroxide. The colloidal stannic hydroxide was evaluated in the same way as above. The bulk density was 2.2 g/ml and the conductivity was 1,700 k$\Omega$.

EXAMPLE 2

Five kinds of transparent aqueous solutions (F–J) were produced in the same way as Example 1 (D) except that amounts of $Sb_2O_3$ shown in Table 2 below were added for one mol of $SnC_2O_4$. The values of the conductivity of these solutions were measured, and the results are shown in Table 2.

TABLE 2

| Sample | F | G | H | I | J |
|---|---|---|---|---|---|
| Quantity of $Sb_2O_3$ added (mol) | 0.005 | 0.03 | 0.05 | 0.25 | 0.35 |
| Conductivity $\Omega$ | 135 | 3 | 1 | 3 | 30 |

The conductivity of the dispersion liquid obtained by adding 0.1 mol $Sb_2O_3$ to Example 1 (D) was 12 k$\Omega$.

EXAMPLE 3

Two kinds of transparent aqueous solutions (K and L) were produced by adding $SnC_2O_4$ to room temperature water and adding 1 mol or 2 mol of a 35 weight % aqueous $H_2O_2$ solutin for 1 mol of $SnC_2O_4$ under stirring to react for 30 minutes.

Transparent aqueous solutions (M amd N) were produced in the same way as above except that one mol of $Sb_2O_3$ for one mol of $SnC_2O_4$ was added together with $SnC_2O_4$. The concentration of $SnC_2O_4$ in the reaction system was determined to be 15 weight % in each case.

After spray-drying the thus obtained aqueous solutions (K–N), the resulting solid matter was pulverized into particles of an average particle diameter of about $5\mu$ by means of a ball mill. The particles were then calcinated in air at 500° C. for 3 hours, thus producing 4 kinds of tin oxide powder (K–N). The bulk density and resistivity were measured under a load of 1 t/cm². The results are shown in Table 3.

TABLE 3

| Sample | Quantity added for 1 mol of $SC_2O_4$ $H_2O_2$ (mol) | $Sb_2O_3$ (mol) | Bulk density (g/ml) | Resistivity ($\Omega$.cm) |
|---|---|---|---|---|
| K | 1 | 0 | 2.4 | $4 \times 10^2$ |
| L | 2 | 0 | 3.4 | $5 \times 10^1$ |
| M | 1 | 0.1 | 2.4 | $8 \times 10^{-1}$ |
| N | 2 | 0.1 | 3.4 | $7 \times 10^{-2}$ |

It is understood from the above Table that by determining the quantity of $H_2O_2$ within the range of this invention, it is possible to improve the conductivity, and by adding a dopant the conductivity is remarkably elevated.

EXAMPLE 4

Under various loads, measurement of bulk density and resistivity was made on Example 3 sample N and tin oxide conductive powder T-1 produced by Mitsubishi Metal Co. Ltd. The results are shown in Table 4.

TABLE 4

| Load (t/cm$^2$) | | 1 | 2 | 3 | 4 | 5 |
|---|---|---|---|---|---|---|
| Bulk density (g/ml) | Sample N | 3.4 | 3.8 | 4.0 | 4.2 | 4.3 |
| | T-1 | 2.2 | 2.7 | 3.3 | 3.9 | 4.3 |
| Resistivity ($\Omega$.cm) | Sample N | $7 \times 10^{-2}$ | $4 \times 10^{-2}$ | $3.4 \times 10^{-2}$ | $3.2 \times 10^{-2}$ | $3.0 \times 10^{-2}$ |
| | T-1 | $8 \times 10^{-1}$ | $7.5 \times 10^{-1}$ | $7 \times 10^{-1}$ | $7 \times 10^{-1}$ | $7.0 \times 10^{-1}$ |

It is clearly understood from the above Table that the product of this invention has excellent conductivity under every load.

Four kinds of tin oxide powder (O–R) were produced in the same way as Example 3 sample N except that the kind of dopant was varied.

The resistivity under the load of 1 t/cm$^2$ was measured for each sample. The results are shown in Table 5.

TABLE 5

| Sample | Kind of dopant | Resisivity ($\Omega$.cm) |
|---|---|---|
| O | SnF$_2$ | 11 |
| P | Cu(HCOO)$_2$ | 34 |
| Q | Nb$_2$O$_5$ | 38 |
| R | Ce$_2$(C$_2$O$_4$)$_3$ | 23 |
| L | none | 50 |

EXAMPLE 6

Six kinds of tin oxide powder (S–X) were produced in the same way as Example 3 sample N except that the quantity of Sb$_2$O$_3$ was varied.

The values of resistivity of these samples under the load of 1 t/cm$^2$ are shown in Table 6.

TABLE 6

| Sample | S | T | U | V | W | X |
|---|---|---|---|---|---|---|
| Quantity of Sb$_2$O$_3$ added (mol) | 0.01 | 0.03 | 0.05 | 0.25 | 0.35 | 0.4 |
| Resistivity ($\Omega$.cm) | $7 \times 10^{-1}$ | $1 \times 10^{-1}$ | $8 \times 10^{-2}$ | $5 \times 10^1$ | $2 \times 10^2$ | $3 \times 10^3$ |

EXAMPLE 7

The transparent aqueous solution (N) of Example 3 was spinner coated at 3,000 rpm onto a quartz glass substrate, and was calcinated in air at 700° C. for two hours to produce a transparent conductive membrane.

The properties of the membrane are shown in Table 7.

TABLE 7

| Membrane thickness (Å) | Percent transmittance (%) | Surface resistivity ($\Omega$/□) | Membrane surface |
|---|---|---|---|
| 300 | 90 | 200 | smooth uniform |

What we claim is:

1. A transparent aqueous tin compound solution prepared by adding, under stirring, tin oxalate into an aqueous medium in such an amount that the tin oxalate is present in said aqueous medium in a concentration below 20% by weight and adding hydrogen peroxide in an amount of 1.6 to 2.2 mols per mol of tin oxalate to effect a reaction between the hydrogen peroxide and tin oxalate, said reaction taking place at a temperature below the boiling point of the aqueous reaction medium, and carrying out said reaction for 5 to 20 minutes.

2. A transparent aqueous medium according to claim 1 wherein there is also present in the reaction system a compound containing elements selected from the groups consisting of Groups 1B, 5B, 5A, 6B, 7B and 8B of the Periodic Table and fluorine, said compound being present in an amount of 0.01 to 0.35 mol per mol of the tin oxalate.

3. A transparent aqueous medium according to claim 2 wherein said compound contains elements selected from the group consisting of Cu, Ag, Au, V, Nb, Ta, As, Sb, Bi, Cr, Mo, W, Ru, Rh, Pd, Os, Ir, Pt, and F.

4. A transparent aqueous medium according to claim 1 wherein the tin oxalate is stannous oxalate.

* * * * *